UNITED STATES PATENT OFFICE.

CARLETON ELLIS, OF LARCHMONT, NEW YORK, ASSIGNOR TO ELLIS-FOSTER COMPANY, A CORPORATION OF NEW JERSEY.

PLASTER COMPOSITION.

955,953.  Specification of Letters Patent.  Patented Apr. 26, 1910.

No Drawing.  Application filed April 12, 1909.  Serial No. 489,353.

*To all whom it may concern:*

Be it known that I, CARLETON ELLIS, citizen of the United States, residing at Larchmont, in the county of Westchester and State of New York, have invented certain new and useful Improvements in Plaster Composition, of which the following is a specification.

This invention relates to a composition intended for plastering of walls and similar purposes and relates particularly to a composition containing calcined sulfate of lime and boracic material.

In the manufacture of borax from the calcareous material constituting the supply of the raw material, a refuse body is obtained consisting largely of sulfate of lime and carrying 2% to 3% anhydrous boracic acid combined more or less with lime, etc. I have found that this material may be calcined to remove the water of hydration of calcium sulfate and in a measure to dehydrate the boracic material so as to produce a composition setting quickly to a hard cementitious mass on admixture with water.

While the sulfate sludge varies more or less in composition, a representative analysis is the following:—lime, 37.28%; sulfuric acid anhydrous, 51.40%; silica, 4.48%; anhydrous boric acid, 2.10%; magnesia, .24%; water, 2.19%. These figures are reckoned on the material in a substantially anhydrous condition.

Prior to dehydration, the calcium sulfate has in combination with it two molecules of water to 1 molecule of calcium sulfate and this should be largely removed by calcination. This is effected by heating the material in kettles with agitation to a temperature of about 360° F. although by careful stirring a temperature of 400° or more may be attained without impairment of the product. By this heat treatment, the water of hydration is largely eliminated and the calcium sulfate in its dehydrated form and in the presence of boracic material, has marked setting qualities and produces a plaster setting to a very desirable degree of hardness. The presence of boracic material tends to prevent shrinking and cracking and overcomes to some extent the brittleness observable in plaster of paris which has been allowed to set.

Calcination may be conducted in a continuous manner in a rotary kiln for example. By heating to temperatures of say 900° or 1000° F. the composition loses the property of rapid setting. The material thus calcined may be combined with a quantity of filling and extending materials and a suitable formula consists of calcined sulfate waste 10 parts, sand 20 parts, short fibered asbestos 2 parts, wood fiber 2 parts. Another formula consists of calcined sulfate waste 10 parts, hydrated lime 7 parts, wood fiber 2 parts, hair 1 part, sand 15 parts. Suitable retarders such as glue may be added to modify the rate of setting.

Other filling and extending materials may of course be introduced as for example, serpentine, asbestine, powdered talc, clay, zinc oxid and various coloring bodies such as iron oxid, ultramarine, Guignets green, and the like.

In using this material, sufficient water is added to make a plastic mass and this is troweled on the wall in the usual manner.

The proportion of sand or other filling material may be varied so as to produce the various effects and qualities desired in the scratch coat, brown coat, finishing coat, etc., according to the circumstances.

Having described my invention to the details of which I do not wish to limit myself, what I claim is:—

1. A cement material comprising lime sulfate borax waste calcined to remove water of hydration.

2. A plaster composition comprising calcined lime sulfate borax waste, filling and extending materials.

3. A plaster composition comprising calcined lime sulfate borax waste, fibrous material and extending material.

4. A plaster composition comprising calcined lime sulfate borax waste, fibrous material and sand.

5. A plaster composition comprising calcined lime sulfate borax waste, fibrous material, sand and hydrated lime.

6. A plaster composition comprising lime sulfate borax waste, calcined at a temperature not exceeding 400° F.

In testimony whereof I have affixed my signature in presence of two witnesses.

CARLETON ELLIS.

Witnesses:
NATHANIEL L. FOSTER,
FRANCES I. NEWMAN.